United States Patent
Liu et al.

(10) Patent No.: US 12,148,335 B2
(45) Date of Patent: Nov. 19, 2024

(54) METHOD FOR IMAGE RENDERING, TERMINAL DEVICE AND NON-TRANSITORY COMPUTER-READABLE STORAGE MEDIUM

(71) Applicant: NETEASE (HANGZHOU) NETWORK CO., LTD., Zhejiang (CN)

(72) Inventors: Libin Liu, Zhejiang (CN); Jiaheng Wang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 18/249,744

(22) PCT Filed: Apr. 19, 2021

(86) PCT No.: PCT/CN2021/088188
§ 371 (c)(1),
(2) Date: Apr. 20, 2023

(87) PCT Pub. No.: WO2022/083081
PCT Pub. Date: Apr. 28, 2022

(65) Prior Publication Data
US 2023/0410706 A1 Dec. 21, 2023

(30) Foreign Application Priority Data
Oct. 20, 2020 (CN) .......................... 202011126324.1

(51) Int. Cl.
*G09G 3/00* (2006.01)
(52) U.S. Cl.
CPC ..... *G09G 3/007* (2013.01); *G09G 2300/0452* (2013.01); *G09G 2320/0233* (2013.01); *G09G 2320/0626* (2013.01)

(58) Field of Classification Search
None
See application file for complete search history.

(56) References Cited

U.S. PATENT DOCUMENTS 10,740,058 B2   8/2020   Sirpal et al.
10,930,223 B2 * 2/2021   Pytlarz ................ G09G 3/3406
(Continued)

FOREIGN PATENT DOCUMENTS

CN    103247281 A    8/2013
CN    103401970 A    11/2013
(Continued)

OTHER PUBLICATIONS

International Search Report dated Jul. 23, 2021 of International Application No. PCT/CN2021/088188.
(Continued)

*Primary Examiner* — Matthew Yeung
(74) *Attorney, Agent, or Firm* — Qinghong Xu

(57) ABSTRACT

A method for image rendering, a terminal device and a non-transitory computer-readable storage medium are provided. The method includes: acquiring at least two target environment brightnesses by performing interpolation on first environment brightness of a terminal in a first environment and second environment brightness of the terminal in a second environment in response to detecting that the terminal switches from the first environment to the second environment; acquiring at least two target lightnesses according to the at least two target environment brightnesses; rendering an image frame to be displayed on the terminal in sequence according to the at least two target lightnesses.

15 Claims, 3 Drawing Sheets

(56) References Cited

U.S. PATENT DOCUMENTS

| | | | | |
|---|---|---|---|---|
| 2013/0328842 | A1* | 12/2013 | Barnhoefer | G06F 3/0443 345/207 |
| 2017/0116963 | A1* | 4/2017 | Wanat | G09G 3/3406 |
| 2018/0204524 | A1* | 7/2018 | Kucera | G09G 3/30 |

FOREIGN PATENT DOCUMENTS

| | | |
|---|---|---|
| CN | 104168371 A | 11/2014 |
| CN | 104538005 A | 4/2015 |
| CN | 104902088 A | 9/2015 |
| CN | 106033665 A | 10/2016 |
| CN | 106128416 A | 11/2016 |
| CN | 106303088 A | 1/2017 |
| CN | 106898329 A | 6/2017 |
| CN | 107591128 A | 1/2018 |
| CN | 108494974 A | 9/2018 |
| CN | 108540638 A | 9/2018 |
| CN | 109036331 A | 12/2018 |
| CN | 109243383 A | 1/2019 |
| CN | 109379503 A | 2/2019 |
| CN | 109885272 A | 6/2019 |
| CN | 109983530 A | 7/2019 |
| CN | 110211548 A | 9/2019 |
| CN | 111179867 A | 5/2020 |
| CN | 112261223 A | 1/2021 |

OTHER PUBLICATIONS

1st Office Action dated Mar. 3, 2021 of Chinese Application No. 202011126324.1.
2nd Office Action dated Aug. 20, 2021 of Chinese Application No. 202011126324.1.
Notice of Reasons for Refusal dated Dec. 1, 2021 of Chinese Application No. 202011126324.1.

* cited by examiner

METHOD FOR IMAGE RENDERING, TERMINAL DEVICE AND NON-TRANSITORY COMPUTER-READABLE STORAGE MEDIUM

CROSS-REFERENCE

The present disclosure is a U.S. National Stage of International Application No. PCT/CN2021/088188, filed on Apr. 19, 2021, and claims priority of Chinese Patent Application No. 202011126324.1, filed on Oct. 20, 2020, entitled "IMAGE RENDERING METHOD AND APPARATUS, AND DEVICE AND STORAGE MEDIUM", the entire content of which is incorporated herein by reference for all purposes.

TECHNICAL FIELD

The present disclosure relates to a field of terminal technology, and more particularly, to a method for image rendering, an apparatus, a device and a storage medium.

BACKGROUND

With rapid development of a terminal device, more and more functions are integrated into the terminal device, and users may use the terminal device, such as a smart phone, a tablet computer, a laptop, for office, entertainment, shopping, etc. Screen brightness adjustment is particularly important for users during the use of the terminal device.

In the related art, the terminal device is equipped with a photosensitive sensor through which surrounding environment brightness may be acquired, then, screen brightness may be acquired according to a preset corresponding relationship between the environment brightness and the screen brightness, and the screen brightness may be further adjusted based on the screen brightness.

It should be noted that information disclosed above is merely configured to enhance understanding of BACKGROUND of the present disclosure, which may include information that does not constitute a prior art known to those skilled in the related art.

SUMMARY

In a first aspect, embodiments of the present disclosure provide a method for image rendering, and the method includes:
acquiring at least two target environment brightnesses by performing interpolation on first environment brightness of a terminal in a first environment and second environment brightness of the terminal in a second environment in response to detecting that the terminal switches from the first environment to the second environment;
acquiring at least two target lightnesses according to the at least two target environment brightnesses;
rendering an image frame to be displayed on the terminal in sequence according to the at least two target lightnesses.

In a second aspect, another embodiment of the present disclosure provides a terminal device, and the terminal device includes a processor and a memory. The memory stores executable instructions of the processor. The processor is configured to execute the following operations: acquiring at least two target environment brightnesses by performing interpolation on first environment brightness of the terminal device in a first environment and second environment brightness of the terminal device in a second environment in response to detecting that the terminal device switches from the first environment to the second environment; acquiring at least two target lightnesses according to the at least two target environment brightnesses; rendering an image frame to be displayed on the terminal device in sequence according to the at least two target lightnesses.

In a third aspect, another embodiment of the present embodiment provides a computer-readable storage medium on which computer instructions are stored. When the computer instructions are run on a terminal device, the computer instructions cause the terminal device to execute the following operations: acquiring at least two target environment brightnesses by performing interpolation on first environment brightness of the terminal device in a first environment and second environment brightness of the terminal device in a second environment in response to detecting that the terminal device switches from the first environment to the second environment; acquiring at least two target lightnesses according to the at least two target environment brightnesses; rendering an image frame to be displayed on the terminal device in sequence according to the at least two target lightnesses.

It should be understood that the foregoing general descriptions and the following detailed descriptions are exemplary and explanatory only, and are not intended to limit the disclosure.

BRIEF DESCRIPTION OF THE DRAWINGS

In order to illustrate the technical solution in embodiments of the present disclosure more clearly, the drawings used in the description of the embodiments are briefly described below. It should be understood that the accompanying drawings below merely show some embodiments of the present disclosure, and cannot be construed as a limitation to the protection scope of the present disclosure. For those of ordinary skills in the art, other drawings may also be obtained according to these drawings without creative work.

DETAILED DESCRIPTION

Figure 1:
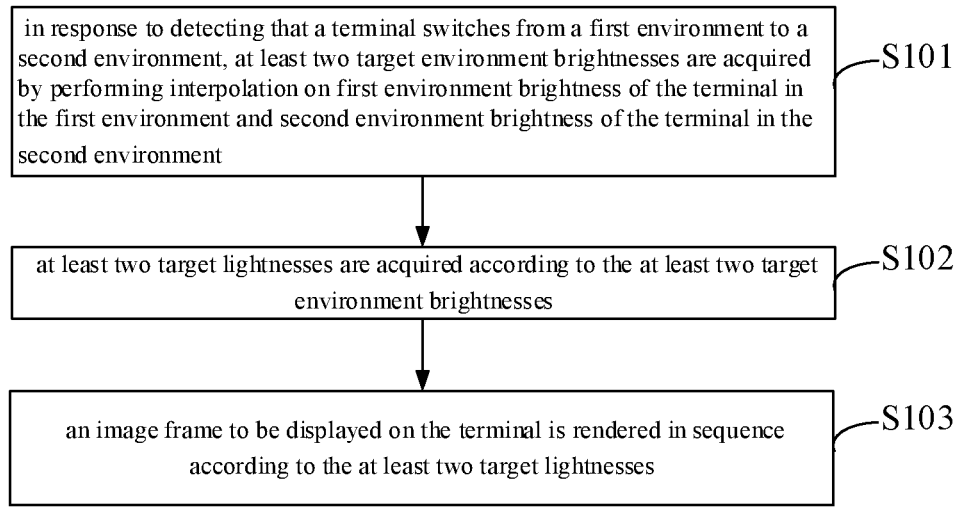
FIG. 1 shows a flow diagram I of a method for image rendering provided by an embodiment of the present disclosure.

In order to make the purpose, technical solutions and advantages of embodiments of the present disclosure more clear, technical solutions of the embodiments of the present disclosure will be clearly and completely described in conjunction with the drawings in the embodiments of the present disclosure in the following. It should be understood that the drawings in the present disclosure are used merely for the purpose of illustration and description, and are not intended to limit the protection scope of the present disclosure. In addition, it should be understood that the schematic drawings are not drawn to scale. The flowchart used in the present disclosure shows operations implemented according to some embodiments of the present disclosure. It should be understood that the operations of the flowchart may be implemented in another order, and steps without logical context may be implemented in a reverse order or implemented simultaneously. In addition, under the guidance of the content of the present disclosure, those skilled in the art can add one or more other operations to the flowchart, or remove one or more operations from the flowchart.

In addition, the described embodiments are only some of the embodiments of the present disclosure, rather than all the embodiments. The components of the embodiments of the present disclosure generally described and shown in the drawings herein may be arranged and designed in various different configurations. Therefore, the following detailed description of the embodiments of the present disclosure provided in the drawings is not intended to limit the claimed scope of the present disclosure, but merely represents preferred embodiments of the present disclosure. Based on the embodiments of the present disclosure, all other embodiments obtained by those skilled in the art without creative work shall fall within the protection scope of the present disclosure.

It should be noted that the term "including" will be used in the embodiments of the present disclosure to indicate the existence of the features described thereafter, but this does not exclude the addition of other features. It is to be noted that the specification and claims of the present disclosure and the terms "first", "second", "third", "fourth" and the like in the drawings are used to distinguish similar objects, and do not need to describe a specific sequence or a precedence order.

At current stage, screen brightness of a terminal device usually includes the following two implementations: one is fixed brightness, and the other is to collect environment brightness through a photosensitive sensor, and then adjust the screen brightness based on the environment brightness. However, a solution of the fixed brightness cannot cope with changes of the environment, which may cause the screen brightness to be dazzling in a low-brightness environment and cause the user unable to see a screen in a high-brightness environment. The solution of adjusting the screen brightness according to the environment brightness may cause the screen to suddenly lighten or darken, affecting user experience.

However, in different environments, methods for the above brightness adjustment may cause a screen to suddenly lighten or darken, affecting user experience.

To address the above shortcomings in the related art, the present disclosure aims to provide a method for image rendering, an apparatus, a device and a storage medium to solve a problem in the related art that a screen suddenly lightens or darkens in different environments, which affects user experience.

To solve the above problems, embodiments of the present disclosure provide a method for image rendering. When the terminal switches from a first environment to a second environment, image frames displayed on the terminal won't suddenly lighten or darken, and the lightness transition of an image is smoother and more natural, thereby improving the user experience.

The method for image rendering provided by the present disclosure is applied to a terminal device, such as a smart phone, a tablet computer, a smart watch, etc. Of course, in the present disclosure, the lightness of the image in the method for image rendering provided by the present disclosure is actively adjusted by the terminal device. In practical applications, the user may also manually adjust the brightness of the screen itself of the terminal device based on actual requirements.

In order to more clearly explain the purpose, the technical solution and advantages of the embodiments of the present disclosure, the technical solution in the embodiments of the present disclosure will be described clearly and completely. Obviously, the described embodiments are only part of the embodiments of the present disclosure, not all of them.

FIG. 1 shows a flow diagram I of a method for image rendering provided by an embodiment of the present disclosure, as shown in FIG. 1. The method includes the following steps S101 to S103:

S101, in response to detecting that a terminal switches from a first environment to a second environment, at least two target environment brightnesses are acquired by performing interpolation on first environment brightness of the terminal in the first environment and second environment brightness of the terminal in the second environment.

The first environment and the second environment may be different location regions. For example, the first environment may be an office, the second environment may be outdoors; the first environment and the second environment may also be the same location region, such as the office, only with the change of time, the environment brightness of the office changes, and thus, the same location region with different environment brightness may also be referred to as the first environment and the second environment.

When the terminal is detected to switch from the first environment to the second environment, the first environment brightness of the terminal in the first environment and the second environment brightness of the terminal in the second environment brightness may be acquired, and the interpolation may be performed according to the first environment brightness and the second environment brightness to acquire at least two target environment brightnesses.

It should be noted that the interpolation refers to interpolating a continuous curve on the basis of discrete data, such that that this continuous curve passes through all the given discrete data points. In the present embodiment, the discrete data may be the first environment brightness and the second environment brightness, the continuous curve may be interpolated to acquire a continuous curve according to the first environment brightness and the second environment brightness, and the continuous curve passes through at least two target environment brightnesses, the first environment brightness and the second environment brightness.

In an embodiment, the at least two target environment brightnesses being acquired by performing the interpolation on the first environment brightness of the terminal in the first environment and the second environment brightness of the terminal in the second environment includes the following steps:

a preset step length is acquired;

the at least two target environment brightnesses are acquired by performing interpolation on the first environment brightness of the terminal in the first environment and the second environment brightness of the terminal in the second environment according to the preset step length.

The preset step length may be a preset interpolation interval. According to the preset step length, the first environment brightness and the second environment brightness are interpolated to acquire the at least two target environment brightnesses. A specific value of the step length may be determined depending on an actual situation, which is not limited in the present embodiment.

It should be noted that the number of target environment brightness is related to the number of preset interpolation intervals. For example, the number of interpolation intervals may be 2, 3, and 4, which represents 2 target environment brightness, 3 target environment brightness, and 4 target environment brightness respectively. The more the number of target environment brightness, the better the transition effect of the rendered image frames. The number of the target environment brightness may be set according to an actual situation, which is not limited in the present embodiment.

S102, at least two target lightnesses are acquired according to the at least two target environment brightnesses.

The target lightness is image brightness of the image frame to be displayed, the number of target environment brightnesses is the same as the number of target lightnesses, and the target environment brightness and the target lightness have a corresponding relationship. In the present embodiment, by querying the corresponding relationship, at least two target lightnesses may be acquired according to the at least two target environment brightnesses.

It should be understood that the change trend of the target environment brightness and the change trend of target lightness may be the same. For example, the at least two target environment brightnesses include a first target environment brightness, a second target environment brightness, and a third target environment brightness, the at least two target lightnesses include a first target lightness, a second target environment brightness, and a third target environment brightness which correspond to the first target environment brightness, the second target environment brightness and the third target environment brightness, respectively; the first target environment brightness is less than the second target environment brightness and is less than the third target environment brightness, the first target lightness may be less than the second target lightness and may be less than the third target lightness.

S103, an image frame to be displayed on the terminal is rendered in sequence according to the at least two target lightnesses.

The image frame to be displayed may be image frame to be displayed when the terminal is in the second environment, and the image frame to be displayed is rendered in sequence according to the at least two target lightnesses. That is, when the terminal is detected to switch from the first environment to the second environment, the image frame to be displayed is not rendered directly according to lightness corresponding to the second environment brightness, the image frame to be displayed is rendered in sequence according to the at least two target lightnesses acquired, such that the image frames displayed on the terminal won't suddenly lighten or darken, and the lightness transition of the image is smoother and more natural.

It should be noted that there may be a plurality of the image frame to be displayed, and a number of the image frame to be displayed may be greater than or equal to a number of target lightnesses. If the number of the image frame to be displayed is equal to the number of target lightnesses, at least two target lightnesses may be used to render the image frame to be displayed in sequence. If the number of the image frame to be displayed is greater than the number of target lightnesses, at least two target lightnesses may be used to render target image frames in sequence, and the lightnesses corresponding to the second environment brightness are used to render the rest of the image frames. The target image frame is a preset number of image frames whose display order is in front in the image frame to be displayed, and the preset number is a number of target lightnesses.

The method for image rendering provided by the present embodiment includes: acquiring at least two target environment brightnesses by performing interpolation on first environment brightness of a terminal in a first environment and second environment brightness of the terminal in a second environment in response to detecting that the terminal switches from the first environment to the second environment; acquiring at least two target lightnesses according to the at least two target environment brightnesses; and rendering an image frame to be displayed on the terminal in sequence according to the at least two target lightnesses. Thus, when the terminal switches from the first environment to the second environment, the image frames displayed by the terminal won't suddenly lighten or darken, and the lightness transition of the image is smoother and more natural, thereby improving the user experience.

Figure 2:
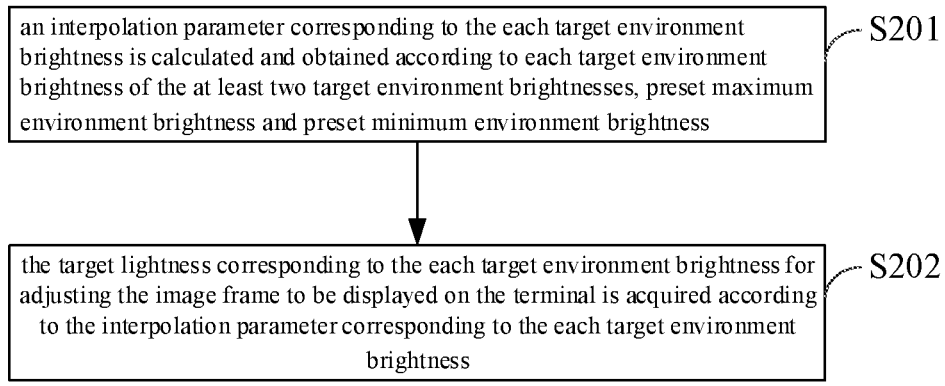
FIG. 2 shows a flow diagram II of a method for image rendering provided by an embodiment of the present disclosure.

In an embodiment, the acquiring at least two target lightnesses according to the at least two target environment brightnesses is illustrated below in combination with the embodiment in FIG. 2. FIG. 2 shows a flow diagram II of a method for image rendering provided by an embodiment of the present disclosure. As shown in FIG. 2, the acquiring the at least two target lightnesses according to the at least two target environment brightnesses includes steps S201 and S202:

S201, an interpolation parameter corresponding to the each target environment brightness is calculated and obtained according to each target environment brightness of the at least two target environment brightnesses, preset maximum environment brightness and preset minimum environment brightness.

The preset maximum environment brightness may be maximum environment brightness under a condition of a normal display. Similarly, the preset minimum environment brightness may be minimum environment brightness under a condition of a normal display. The normal display refers to that the user may see the image frames displayed on the screen clearly.

The preset maximum environment brightness and the preset minimum environment brightness may be selected depending on an actual situation, and in the present embodiment, specific values of the preset maximum environment brightness and the preset minimum environment brightness are not limited herein.

The interpolation parameter corresponding to the each target environment brightness may be calculated and obtained according to each target environment brightness of the at least two target environment brightnesses, the preset maximum environment brightness and the preset minimum environment brightness. That is, the interpolation parameter and the target environment brightness have a corresponding relationship, and the interpolation parameter is used to indicate a relative magnitude relationship between the target environment brightness and the preset maximum environment brightness, the preset minimum environment brightness.

In an embodiment, the target environment brightness may be calculated and obtained by using the following formula:

$$I_M = (I_{from} - I_{to}) \cdot \frac{(N-n)}{N} - I_{to}$$

$I_M$ is M-th target environment brightness, $I_{from}$ is first environment brightness, $I_{to}$ is second environment brightness, N is a total step length, and that is a number of interpolation intervals, n is a n-th interpolation interval, M is greater than or equal to 1, and less than or equal to N.

According to the above formula, taking the first interpolation interval as an example, the first target environment brightness may be calculated and obtained. Similarly, the second target environment brightness may be calculated and obtained by using the second interpolation interval.

Then, the interpolation parameter corresponding to the each target environment brightness may be calculated and obtained by using the following formula:

$$P_M = \frac{\ln I_M - \ln I_{min}}{\ln I_{max} - \ln I_{min}}$$

$P_M$ is a M-th interpolation parameter, $I_M$ is M-th target environment brightness, $I_{min}$ is preset minimum environment brightness, and $I_{max}$ is preset maximum environment brightness.

According to the above formula, taking the first target environment brightness as an example, the first interpolation parameter corresponding to the first target environment brightness may be calculated and obtained. Similarly, the second interpolation parameter corresponding to the second target environment brightness may be calculated and obtained by using the second target environment brightness.

S202, the target lightness corresponding to the each target environment brightness for adjusting the image frame to be displayed on the terminal is acquired according to the interpolation parameter corresponding to the each target environment brightness.

The target environment brightness and the target lightness have a corresponding relationship, the target lightness corresponding to the each target environment brightness for adjusting the image frame to be displayed on the terminal may be acquired according to the interpolation parameter corresponding to the each target environment brightness. That is, the interpolation parameter corresponding to the target environment brightness and the target lightness corresponding to the target environment brightness have a corresponding relationship.

In an embodiment, the target lightness corresponding to each target environment brightness may be calculated and obtained according to the interpolation parameter corresponding to each target environment brightness, preset maximum lightness, and preset default lightness.

The preset maximum lightness may be maximum lightness that the image frame is able to be adjusted to, and the user may see the image frame clearly under the preset maximum lightness. The preset default lightness may be default lightness of the image frame. Generally, each image frame has default lightness, and the default lightness may be minimum lightness that the image frame is able to be adjusted to, or may be any lightness from the minimum lightness to maximum lightness, which may be determined depending on a setting situation, which is not limited in the present embodiment.

In an embodiment, the acquiring the target lightness corresponding to the each target environment brightness for adjusting the image frame to be displayed on the terminal according to the interpolation parameter corresponding to the each target environment brightness includes:

a difference between preset maximum lightness and preset default lightness is calculated;

a product value of the difference and the interpolation parameter is calculated;

a sum of the product value and the preset default lightness is determined as the target lightness corresponding to the target environment brightness for adjusting the image frame to be displayed on the terminal.

Referring to the Following Formula:

$$B_M(B_{max} - B_{default}) \cdot P_M + B_{default}$$

$B_M$ is M-th target lightness, $B_{max}$ is preset maximum lightness, $P_M$ is M-th interpolation parameter, and $B_{default}$ is preset default lightness.

the difference $B_{max} - B_{default}$ between the preset maximum lightness and the preset default lightness is calculated, the product value $(B_{max} - B_{default}) \cdot P_M$ of the difference and the interpolation parameter are calculated, and the sum $(B_{max} - B_{default}) \cdot P_M + B_{default}$ of the product and the preset default lightness is determined as the target lightness corresponding to the target environment brightness.

The method for image rendering provided by the present embodiment includes: calculating and obtaining the interpolation parameter corresponding to the each target environment brightness according to each target environment brightness of the at least two target environment brightnesses, the preset maximum environment brightness and the preset minimum environment brightness, and acquiring the target lightness corresponding to the each target environment brightness for adjusting the image frame to be displayed on the terminal according to the interpolation parameter corresponding to the each target environment brightness, so as to acquire the target lightness according to the interpolation parameter and improve accuracy of the target lightness.

In an embodiment, the acquiring the at least two target environment brightnesses by performing the interpolation on the first environment brightness of the terminal in the first environment and the second environment brightness of the terminal in the second environment includes:

the first environment brightness and the second environment brightness are normalized, respectively;

the at least two target environment brightnesses are acquired by performing interpolation on normalized first environment brightness and normalized second environment brightness.

A dynamic range of brightness change in nature is the sixth power of 10, and the brightness that some screens may express is limited, it is also possible to normalize the first environment brightness and the second environment brightness respectively, and then interpolate the normalized first environment brightness and the normalized second environment brightness to acquire at least two target environment brightnesses.

In an embodiment, the normalizing the first environment brightness and the second environment brightness respectively includes: adjusting the first environment brightness and the second environment brightness to a preset range.

For example, the preset range may be [0, 1], that is, the normalized first environment brightness and the normalized second environment brightness may be expressed by a normalized value between 0 and 1, and then the at least two target environment brightnesses are acquired by performing interpolation on the normalized first environment brightness and the normalized second environment brightness.

Figure 3:
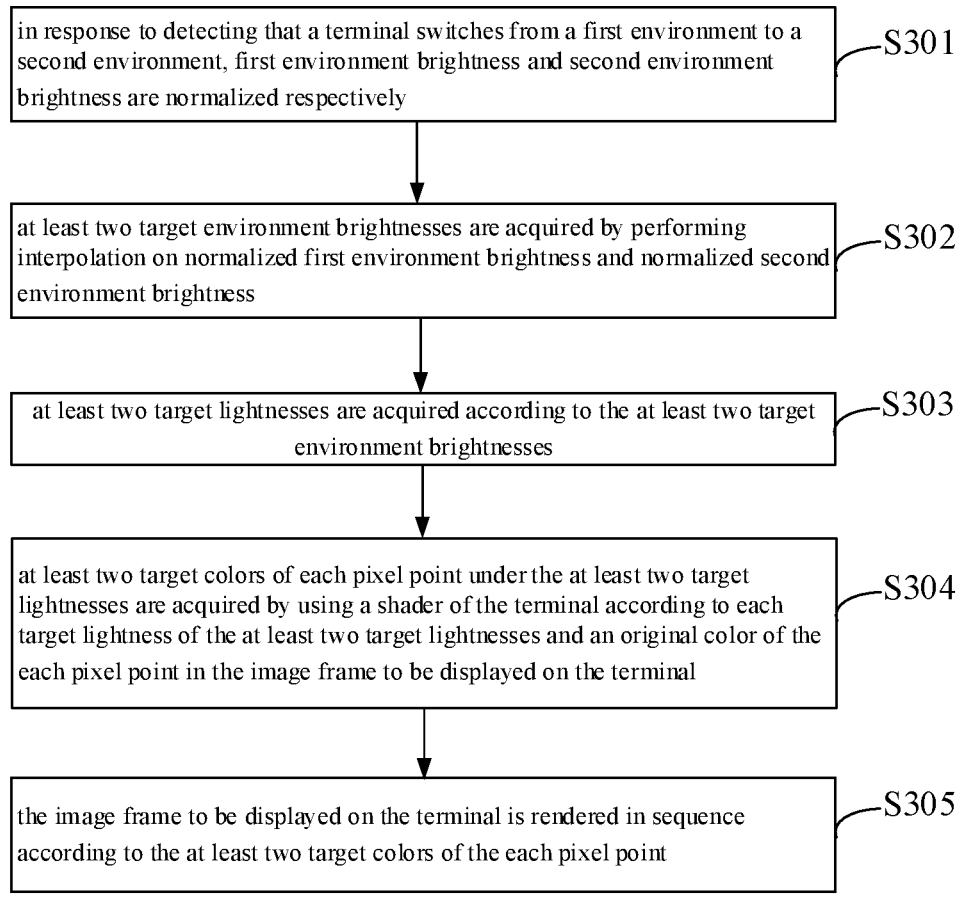
FIG. 3 shows a flow diagram III of a method for image rendering provided by an embodiment of the present disclosure.

The following describes a specific method for image rendering in combination with the embodiment of FIG. 3.

FIG. 3 shows a flow diagram III of a method for image rendering provided by an embodiment of the present disclosure, as shown in FIG. 3, the method includes the following steps S301 to S305:

S301, in response to detecting that a terminal switches from a first environment to a second environment, first environment brightness and second environment brightness are normalized respectively.

S302, at least two target environment brightnesses are acquired by performing interpolation on normalized first environment brightness and normalized second environment brightness.

The terminal is provided with a photosensitive sensor to collect environment brightness of the environment where the terminal is located. When the terminal is detected to switch from the first environment to the second environment, the first environment brightness of the terminal in the first environment and the second environment brightness of the terminal in the second environment may be acquired through the photosensitive sensor, the first environment brightness and the second environment brightness are normalized respectively, and at least two target environment brightnesses are acquired by performing interpolation on normalized first environment brightness and normalized second environment brightness.

Taking an Android platform as an example, when the first environment brightness and the second environment brightness are acquired through the photosensitive sensor, the implementation may be performed on software in the following manner:

A sensor manager is obtained through "mContext.getSystemService( )";

A listener of the sensor is registered in "onResume( )", and the listener of the sensor is unregistered in "onPause( )";

the first environment brightness and the second environment brightness are acquired in real time through the registered listener.

It should be noted that, events are usually registered and de-registered to manage their timing of taking effect, just as creation and destruction occur in pairs. Thus, the listener of the sensor is registered in "onResume( )", and the listener of the sensor needs to be unregistered in "onPause( )", which mainly avoids incorrect references.

S303, at least two target lightnesses are acquired according to the at least two target environment brightnesses.

The specific process of steps S301 to S303 is similar to that of steps S101 and S102, which will not be repeated herein.

Then, the image frame to be displayed on the terminal may be rendered in sequence according to the at least two target lightnesses, which includes:

S304, at least two target colors of each pixel point under the at least two target lightnesses are acquired by using a shader of the terminal according to each target lightness of the at least two target lightnesses and an original color of the each pixel point in the image frame to be displayed on the terminal;

S305, the image frame to be displayed on the terminal is rendered in sequence according to the at least two target colors of the each pixel point.

The original color of the each pixel point in the image frame is a color of each pixel point without being affected by the brightness.

The shader of the terminal (shader) is used to color the image frame to be displayed on the terminal. Using the shader of the terminal, according to each target lightness and the original color of each pixel point in the image frame to be displayed, at least two target colors of each pixel point under the at least two target lightnesses may be acquired. That is, based on the original color of each pixel point, the target lightness is taken into consideration, and thus, a color of each pixel point under the target lightness may be acquired. For example, the original color of the pixel point is positive red, the target lightness is taken into consideration, and thus the color of the pixel point under the target lightness is positive red.

Then, according to the at least two target colors of each pixel point, the image frame to be displayed on the terminal is rendered in sequence. That is, the color of each pixel point and the image frame have a corresponding relationship, and the image frame to be displayed is rendered in sequence according to the determined at least two target colors of each pixel point.

In an embodiment, at least two target lightnesses may be stored in a R channel of the image frame to be displayed. Using the shader of the terminal, at least two target colors of each pixel point under the at least two target lightnesses may be acquired, and then the color of each pixel point and a sample color of the image frame may be interpolated to acquire a color value of BT.709 color space.

Further, in order to achieve a high-dynamic range (HDR) image effect, the color value of the BT.709 color space is multiplied by a preset conversion vector to acquire a color value of BT.2020 color space. Since the color value recognized by the screen is in a range of (0, 1), the color value of the BT.2020 color space is mapped to the range of (0, 1) through a formula, so as to set a final value as a color value of the pixel point.

The method for image rendering provided by the present embodiment includes: in response to detecting that the terminal switches from a first environment to a second environment, normalizing first environment brightness and second environment brightness, respectively; acquiring at least two target environment brightnesses by performing interpolation on normalized first environment brightness and normalized second environment brightness; acquiring at least two target lightnesses according to the at least two target environment brightnesses; acquiring at least two target colors of each pixel point under the at least two target lightnesses by using a shader of the terminal according to each target lightness of the at least two target lightnesses and an original color of the each pixel point in the image frame to be displayed on the terminal; rendering the image frame to be displayed on the terminal in sequence according to the at least two target colors of the each pixel point. Thus, when the terminal switches from the first environment to the second environment, the image frame to be displayed on the terminal is rendered in sequence according to at least two target colors of the pixel points, such that the image frame displayed on the terminal won't suddenly lighten or darken, and the lightness transition of the image is smoother and more natural, thereby improving the user experience.

Figure 4:
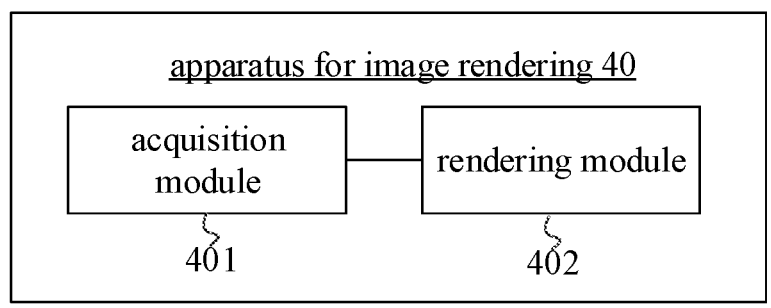
FIG. 4 shows a structure diagram of an apparatus for image rendering provided by an embodiment of the present disclosure.

FIG. 4 shows a structure diagram of an apparatus for image rendering provided by an embodiment of the present disclosure. The apparatus for image rendering may be integrated in a terminal device. As shown in FIG. 4, the apparatus for image rendering 40 includes:

an acquisition module 401, configured to acquire at least two target environment brightnesses by performing interpolation on first environment brightness of a terminal in a first environment and second environment brightness of the terminal in a second environment in response to detecting that the terminal switches from the first environment to the second environment, and acquire at least two target lightnesses according to the at least two target environment brightnesses a rendering module 402, configured to render image frame to be displayed on the terminal in sequence according to the at least two target lightnesses.

In an embodiment, the acquisition module 401 is specifically configured to execute:

calculate and obtain an interpolation parameter corresponding to each target environment brightness according to the each target environment brightness of the at least two target environment brightnesses, preset maximum environment brightness and preset minimum environment brightness;

acquire the target lightness corresponding to the each target environment brightness for adjusting the image frame to be displayed on the terminal according to the interpolation parameter corresponding to the each target environment brightness.

In an embodiment, the acquisition module 401 is specifically configured to execute:

calculate a difference between preset maximum lightness and preset default lightness;

calculate a product value of the difference and the interpolation parameter;

determine a sum of the product value and the preset default lightness as the target lightness corresponding to the target environment brightness for adjusting the image frame to be displayed on the terminal.

In an embodiment, the rendering module 402 is specifically configured to execute:

acquire, by using a shader of the terminal, at least two target colors of each pixel point under the at least two target lightnesses, according to each target lightness of the at least two target lightnesses and an original color of the each pixel point in the image frame to be displayed on the terminal;

render the image frame to be displayed on the terminal in sequence according to the at least two target colors of the each pixel point.

In an embodiment, the acquisition module 401 is specifically configured to execute:

normalize the first environment brightness and the second environment brightness respectively;

acquire the at least two target environment brightnesses by performing interpolation on normalized first environment brightness and normalized second environment brightness.

In an embodiment, the acquisition module 401 is specifically configured to execute:

adjust the first environment brightness and the second environment brightness to a preset range.

In an embodiment, the acquisition module 401 is specifically configured to execute:

acquire a preset step length;

acquire the at least two target environment brightnesses by performing interpolation on the first environment brightness of the terminal in the first environment and the second environment brightness of the terminal in the second environment according to the preset step length.

The apparatus for adjusting the screen brightness provided by the present embodiment includes an acquisition module, configured to acquire at least two target environment brightnesses by performing interpolation on first environment brightness of a terminal in a first environment and second environment brightness of the terminal in a second environment in response to detecting that the terminal switches from the first environment to the second environment, and acquire at least two target lightnesses according to the at least two target environment brightnesses; a rendering module, configured to render image frame to be displayed on the terminal in sequence according to the at least two target lightnesses. Thus, when the terminal switches from the first environment to the second environment, the image frame displayed on the terminal won't suddenly lighten or darken, and the lightness transition of the image is smoother and more natural, thereby improving the user experience.

Figure 5:
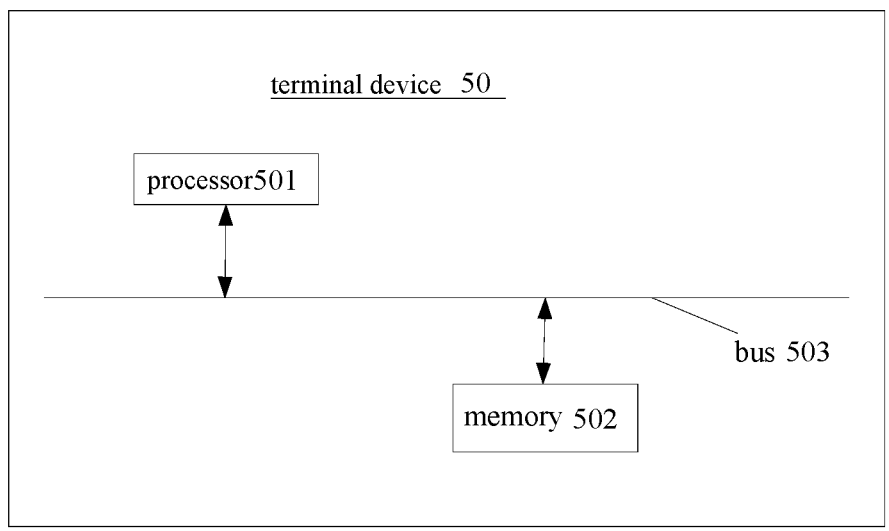
FIG. 5 shows a structure diagram of a terminal device provided by an embodiment of the present disclosure.

Embodiments of the present disclosure also provide a terminal device 50. FIG. 5 shows a structure diagram of a terminal device provided by an embodiment of the present disclosure, as shown in FIG. 5. The terminal device 50 includes:

a processor 501 and a memory 502;

The memory 502 stores executable instructions of the processor 501. The processor 501 is configured to execute the above method embodiments by executing the executable instructions.

In an embodiment, the processor 501 and the memory 502 may be independent structures or integrated structures. When the processor 501 and the memory 502 are independent structures, the memory 502 and the processor 501 may be coupled and connected via a bus 503.

Embodiments of the present disclosure also provide a computer-readable storage medium on which a computer program is stored. The computer program is executed when run by a processor.

In a first aspect, embodiments of the present disclosure provide a method for image rendering, and the method includes:

acquiring at least two target environment brightnesses by performing interpolation on first environment brightness of a terminal in a first environment and second environment brightness of the terminal in a second environment in response to detecting that the terminal switches from the first environment to the second environment;

acquiring at least two target lightnesses according to the at least two target environment brightnesses;

rendering an image frame to be displayed on the terminal in sequence according to the at least two target lightnesses.

In an optional embodiment, the acquiring the at least two target lightnesses according to the at least two target environment brightnesses includes:

calculating and obtaining an interpolation parameter corresponding to each target environment brightness according to the each target environment brightness of the at least two target environment brightnesses, preset maximum environment brightness and preset minimum environment brightness;

acquiring the target lightness corresponding to the each target environment brightness for adjusting the image frame to be displayed on the terminal according to the interpolation parameter corresponding to the each target environment brightness.

In an optional embodiment, the acquiring the target lightness corresponding to the each target environment brightness for adjusting the image frame to be displayed on the terminal according to the interpolation parameter corresponding to the each target environment brightness includes:

calculating a difference between preset maximum lightness and preset default lightness;

calculating a product value of the difference and the interpolation parameter;

determining a sum of the product value and the preset default lightness as the target lightness corresponding to the target environment brightness for adjusting the image frame to be displayed on the terminal.

In an optional embodiment, the rendering the image frame to be displayed on the terminal in sequence according to the at least two target lightnesses includes:

acquiring, by using a shader of the terminal, at least two target colors of each pixel point under the at least two target lightnesses, according to each target lightness of the at least two target lightnesses and an original color of the each pixel point in the image frame to be displayed on the terminal;

rendering the image frame to be displayed on the terminal in sequence according to the at least two target colors of the each pixel point.

In an optional embodiment, the acquiring the at least two target environment brightnesses by performing the interpolation on the first environment brightness of the terminal in the first environment and the second environment brightness of the terminal in the second environment includes:

normalizing the first environment brightness and the second environment brightness respectively;

acquiring the at least two target environment brightnesses by performing interpolation on normalized first environment brightness and normalized second environment brightness.

In an optional embodiment, the normalizing the first environment brightness and the second environment brightness respectively includes:

adjusting the first environment brightness and the second environment brightness to a preset range.

In an optional embodiment, the acquiring the at least two target environment brightnesses by performing the interpolation on the first environment brightness of the terminal in the first environment and the second environment brightness of the terminal in the second environment includes:

acquiring a preset step length;

acquiring the at least two target environment brightnesses by performing interpolation on the first environment brightness of the terminal in the first environment and the second environment brightness of the terminal in the second environment according to the preset step length.

In a second aspect, another embodiment of the present disclosure provides an apparatus for image rendering, and the apparatus includes:

an acquisition module, configured to acquire at least two target environment brightnesses by performing interpolation on first environment brightness of a terminal in a first environment and second environment brightness of the terminal in a second environment in response to detecting that the terminal switches from the first environment to the second environment, and acquire at least two target lightnesses according to the at least two target environment brightnesses a rendering module, configured to render image frame to be displayed on the terminal in sequence according to the at least two target lightnesses.

In an optional embodiment, the acquisition module is specifically configured to execute:

calculate and obtain an interpolation parameter corresponding to each target environment brightness according to the each target environment brightness of the at least two target environment brightnesses, preset maximum environment brightness and preset minimum environment brightness;

acquire the target lightness corresponding to the each target environment brightness for adjusting the image frame to be displayed on the terminal according to the interpolation parameter corresponding to the each target environment brightness.

In an optional embodiment, the acquisition module is specifically configured to execute:

calculate a difference between preset maximum lightness and preset default lightness;

calculate a product value of the difference and the interpolation parameter;

determine a sum of the product value and the preset default lightness as the target lightness corresponding to the target environment brightness for adjusting the image frame to be displayed on the terminal.

In an optional embodiment, the rendering module is specifically configured to execute:

acquire, by using a shader of the terminal, at least two target colors of each pixel point under the at least two target lightnesses, according to each target lightness of the at least two target lightnesses and an original color of the each pixel point in the image frame to be displayed on the terminal;

render the image frame to be displayed on the terminal in sequence according to the at least two target colors of the each pixel point.

In an optional embodiment, the acquisition module is specifically configured to execute:

normalize the first environment brightness and the second environment brightness respectively;

acquire the at least two target environment brightnesses by performing interpolation on normalized first environment brightness and normalized second environment brightness.

In an optional embodiment, the acquisition module is specifically configured to execute:

adjust the first environment brightness and the second environment brightness to a preset range.

In an optional embodiment, the acquisition module is specifically configured to execute:

acquire a preset step length;

acquire the at least two target environment brightnesses by performing interpolation on the first environment brightness of the terminal in the first environment and the second environment brightness of the terminal in the second environment according to the preset step length.

In a third aspect, another embodiment of the present disclosure provides a terminal device, and the terminal device includes a processor and a memory. The memory stores executable instructions of the processor. The processor is configured to execute the method described in the above first aspect by executing the executable instructions.

In a fourth aspect, another embodiment of the present embodiment provides a computer-readable storage medium on which computer instructions are stored. When the computer instructions are run on a terminal device, the computer instructions cause the terminal device to execute the method described in the above first aspect.

It should be understood that the foregoing general descriptions and the following detailed descriptions are exemplary and explanatory only, and are not intended to limit the disclosure.

It may be clearly understood by a person skilled in the art that for the purpose of convenient and brief description, for a detailed working process of the described apparatus refer to a corresponding process in the foregoing method embodiments, which are not described in detail herein. In the several embodiments provided in this disclosure, it should be understood that the disclosed apparatus and method may be implemented in other manners. For example, the described apparatus embodiments are merely examples. For example, division of modules is merely logical function division. During actual implementation, there may be another division manners. For another example, a plurality of modules or components may be combined or integrated into another system, or some features may be omitted or not performed. In addition, the displayed or discussed mutual couplings or direct couplings or communication connections may be implemented through some communication interfaces. The indirect couplings or communication connections between the apparatuses or modules may be implemented in an electrical form, a mechanical form, or another form.

In addition, functional units in the embodiments of the present disclosure may be integrated into one processing unit, or each of the units may exist alone physically, or two or more units are integrated into one unit. When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of the present disclosure. The foregoing storage medium includes: any medium that can store program code, for example a USB flash drive, a removable hard disk drive, a read-only memory, a random access memory, a magnetic disk, or an optical disc.

The foregoing descriptions are merely embodiments of the present disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of the present disclosure shall be subject to the protection scope of the claims.

What is claimed is:

1. A method for image rendering, applied to a terminal, comprising:
    acquiring at least two target environment brightnesses by performing interpolation on first environment brightness of the terminal in a first environment and second environment brightness of the terminal in a second environment in response to detecting that the terminal switches from the first environment to the second environment;
    acquiring at least two target lightnesses according to the at least two target environment brightnesses;
    rendering an image frame to be displayed on the terminal in sequence according to the at least two target lightnesses;
    wherein the rendering the image frame to be displayed on the terminal in sequence according to the at least two target lightnesses comprises:
    acquiring, by using a shader of the terminal, at least two target colors of each pixel point under the at least two target lightnesses, according to each target lightness and an original color of the each pixel point in the image frame to be displayed on the terminal;
    rendering the image frame to be displayed on the terminal in sequence according to the at least two target colors.

2. The method according to claim 1, wherein the acquiring the at least two target lightnesses according to the at least two target environment brightnesses comprises:
    calculating and obtaining an interpolation parameter corresponding to each target environment brightness according to the each target environment brightness of the at least two target environment brightnesses, preset maximum environment brightness and preset minimum environment brightness;
    acquiring the target lightness corresponding to the each target environment brightness for adjusting the image frame to be displayed on the terminal according to the interpolation parameter.

3. The method according to claim 2, wherein the acquiring the target lightness corresponding to the each target environment brightness for adjusting the image frame to be displayed on the terminal according to the interpolation parameter comprises:
    calculating a difference between preset maximum lightness and preset default lightness;
    calculating a product value of the difference and the interpolation parameter;
    determining a sum of the product value and the preset default lightness as the target lightness.

4. The method according to claim 1, wherein the acquiring the at least two target environment brightnesses by performing the interpolation on the first environment brightness of the terminal in the first environment and the second environment brightness of the terminal in the second environment comprises:
    normalizing the first environment brightness and the second environment brightness respectively;
    acquiring the at least two target environment brightnesses by performing interpolation on normalized first environment brightness and normalized second environment brightness.

5. The method according to claim 4, wherein the normalizing the first environment brightness and the second environment brightness respectively comprises:
    adjusting the first environment brightness and the second environment brightness to a preset range.

6. The method according to claim 1, wherein the acquiring the at least two target environment brightnesses by performing the interpolation on the first environment brightness of the terminal in the first environment and the second environment brightness of the terminal in the second environment comprises:
    acquiring a preset step length;
    acquiring the at least two target environment brightnesses by performing interpolation on the first environment brightness and the second environment brightness according to the preset step length.

7. A terminal device, comprising a processor and a memory having executable instructions of the processor stored therein; wherein the processor is configured to execute the following operations:
    acquiring at least two target environment brightnesses by performing interpolation on first environment brightness of the terminal device in a first environment and second environment brightness of the terminal device in a second environment in response to detecting that the terminal device switches from the first environment to the second environment;

acquiring at least two target lightnesses according to the at least two target environment brightnesses;

rendering an image frame to be displayed on the terminal device in sequence according to the at least two target lightnesses;

wherein the rendering the image frame to be displayed on the terminal device in sequence according to the at least two target lightnesses comprises:

acquiring, by using a shader of the terminal device, at least two target colors of each pixel point under the at least two target lightnesses, according to each target lightness and an original color of the each pixel point in the image frame to be displayed on the terminal device;

rendering the image frame to be displayed on the terminal device in sequence according to the at least two target colors.

8. The terminal device according to claim 7, wherein the acquiring the at least two target lightnesses according to the at least two target environment brightnesses comprises:

calculating and obtaining an interpolation parameter corresponding to each target environment brightness according to the each target environment brightness of the at least two target environment brightnesses, preset maximum environment brightness and preset minimum environment brightness;

acquiring the target lightness corresponding to the each target environment brightness for adjusting the image frame to be displayed on the terminal device according to the interpolation parameter.

9. The terminal device according to claim 8, wherein the acquiring the target lightness corresponding to the each target environment brightness for adjusting the image frame to be displayed on the terminal device according to the interpolation parameter comprises:

calculating a difference between preset maximum lightness and preset default lightness;

calculating a product value of the difference and the interpolation parameter;

determining a sum of the product value and the preset default lightness as the target lightness.

10. The terminal device according to claim 7, wherein the acquiring the at least two target environment brightnesses by performing the interpolation on the first environment brightness of the terminal device in the first environment and the second environment brightness of the terminal device in the second environment comprises:

normalizing the first environment brightness and the second environment brightness respectively;

acquiring the at least two target environment brightnesses by performing interpolation on normalized first environment brightness and normalized second environment brightness.

11. The terminal device according to claim 10, wherein the normalizing the first environment brightness and the second environment brightness respectively comprises:

adjusting the first environment brightness and the second environment brightness to a preset range.

12. The terminal device according to claim 7, wherein the acquiring the at least two target environment brightnesses by performing the interpolation on the first environment brightness of the terminal device in the first environment and the second environment brightness of the terminal device in the second environment comprises:

acquiring a preset step length;

acquiring the at least two target environment brightnesses by performing interpolation on the first environment brightness and the second environment brightness according to the preset step length.

13. A non-transitory computer-readable storage medium having computer instructions stored therein, when the computer instructions are run on a terminal device, the computer instructions cause the terminal device to execute the following operations:

acquiring at least two target environment brightnesses by performing interpolation on first environment brightness of the terminal device in a first environment and second environment brightness of the terminal device in a second environment in response to detecting that the terminal device switches from the first environment to the second environment;

acquiring at least two target lightnesses according to the at least two target environment brightnesses;

rendering an image frame to be displayed on the terminal device in sequence according to the at least two target lightnesses;

wherein the rendering the image frame to be displayed on the terminal device in sequence according to the at least two target lightnesses comprises:

acquiring, by using a shader of the terminal device, at least two target colors of each pixel point under the at least two target lightnesses, according to each target lightness and an original color of the each pixel point in the image frame to be displayed on the terminal device;

rendering the image frame to be displayed on the terminal device in sequence according to the at least two target colors.

14. The non-transitory computer-readable storage medium according to claim 13, wherein the acquiring the at least two target lightnesses according to the at least two target environment brightnesses comprises:

calculating and obtaining an interpolation parameter corresponding to each target environment brightness according to the each target environment brightness of the at least two target environment brightnesses, preset maximum environment brightness and preset minimum environment brightness;

acquiring the target lightness corresponding to the each target environment brightness for adjusting the image frame to be displayed on the terminal device according to the interpolation parameter.

15. The non-transitory computer-readable storage medium according to claim 14, wherein the acquiring the target lightness corresponding to the each target environment brightness for adjusting the image frame to be displayed on the terminal device according to the interpolation parameter comprises:

calculating a difference between preset maximum lightness and preset default lightness;

calculating a product value of the difference and the interpolation parameter;

determining a sum of the product value and the preset default lightness as the target lightness.

* * * * *